April 28, 1925.                                                    1,535,202
F. CONLIN
METHOD OF REMOVING SLAG AND OF NEUTRALIZING FUMES ARISING IN
TREATMENT OF MOLTEN METALS
Filed Jan. 5, 1923
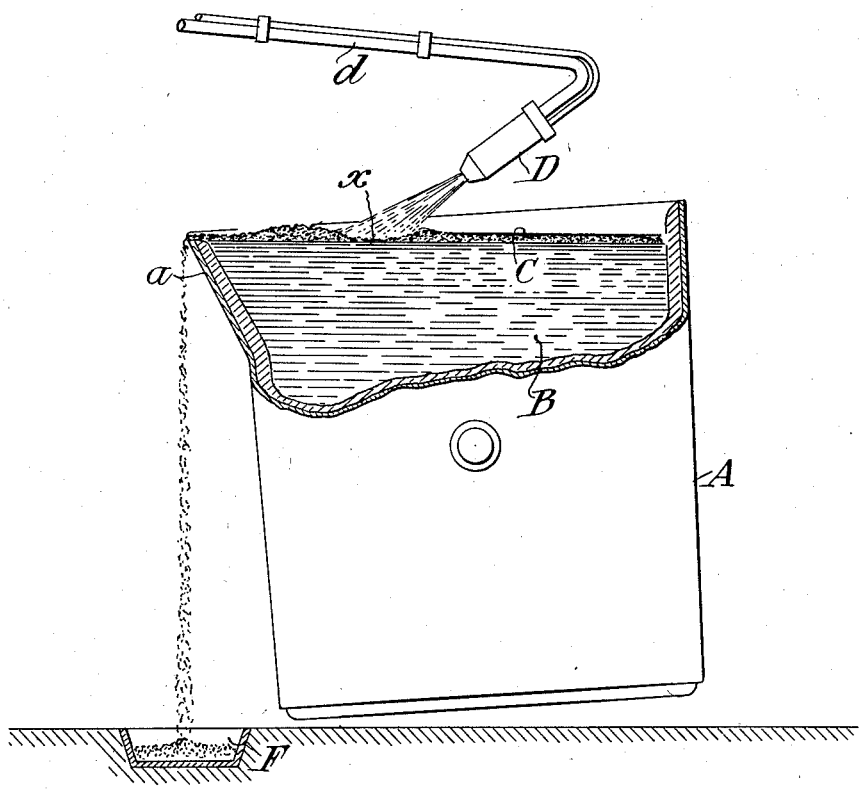
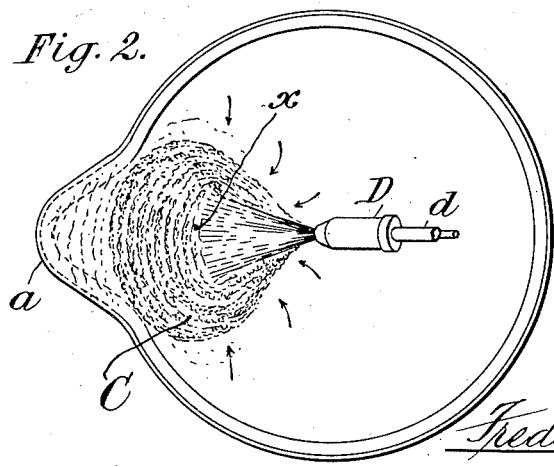
INVENTOR:
Frederick Conlin
By Attorneys,
Fraser Burke & Myers Patented Apr. 28, 1925.

1,535,202

UNITED STATES PATENT OFFICE.

FREDERICK CONLIN, OF WESTFIELD, NEW JERSEY, ASSIGNOR TO JOHN T. PRATT, OF NEW YORK, N. Y., DANIEL D. JACKSON, OF BROOKLYN, NEW YORK, AND JOSEPH D. SEARS, OF BLOOMFIELD, NEW JERSEY, JOINT TRUSTEES, CONSTITUTING A NEW YORK TRUST ESTATE.

METHOD OF REMOVING SLAG AND OF NEUTRALIZING FUMES ARISING IN TREATMENT OF MOLTEN METALS.

Application filed January 5, 1923. Serial No. 610,776.

*To all whom it may concern:*

Be it known that I, FREDERICK CONLIN, a citizen of the United States of America, residing in Westfield, in the county of Union and State of New Jersey, have invented certain new and useful improvements in methods of removing slag and of neutralizing fumes arising in treatment of molten metals, of which the following is a specification.

This invention relates to a method of removing slag, especially fluid slag, from the surface of molten metals; also to a method of neutralizing fumes arising from reagents used in the treatment of metals; and to a combination of these methods wherein slag is removed and fumes neutralized, simultaneously.

According to the present invention the slag or residue on the surface of a bath of molten metal, as for example, the slag on metal in a ladle or any other container of the metal, is blown off by a liquid or gaseous jet, the bath or ladle being preferably tipped so that the slag is at about the level of the lower edge or lip of the container. This fluid jet is preferably in the form of a flame-jet of burning carbonaceous fuel (fuel oil, for example) directed onto the slag or residue from a fuel burner, and in which the supply of oxygen is so regulated as to produce a non-oxidizing flame.

The method herein disclosed of removing slag or residue is especially useful in removing the fluid slags or residue formed by alkaline reagents such as are used for removing impurities from metals. Such reagents give off to a greater or less extent fumes of an irritating nature, and the flame gases (carbon oxids in particular) provide a method of simultaneously neutralizing these irritating fumes, the carbon oxids uniting with the fumes and forming non-irritating compounds. The flame or other gas jet, however, may be used for neutralizing the alkaline fumes, aside from its use for removing slag.

A specific procedure in carrying out said method will be described in connection with the accompanying drawings, in which:

Figure 1 is a cross-section through a ladle, from which slag is being removed;

Fig. 2 is a view in plan showing the action of the gas jet on the slag.

In said drawings, A designates a ladle containing molten metal B, and having a supernatant slag or residue C thereon. The ladle is tipped so as to bring the slag level to about the level of the lip *a* of the ladle, and to allow as much of the slag to run off as will without assistance. D represents a fuel-oil burner or nozzle which is conveniently provided with a long handle or tube *d* by which the burner may be held by a workman and the flame-jet projected from said burner manipulated to remove or sweep the slag, or that part which will not run off, from the surface of the molten metal.

The jet of flame or gas from the burner or nozzle D will blow the slag ahead of it in a stream toward the lip of the ladle, and cause a slight depression in the slag, shown considerably exaggerated in Fig. 1, at *x*, toward which the slag not in the path of said flame-jet will be attracted. Therefore, in manipulating the burner or nozzle D, the jet is repeatedly drawn over the surface of the metal from the outer edges of the slag layer toward the pouring lip *a* (Fig. 2). The formation of the depression *x* very much facilitates the clearing off of the slag, as the tendency of the slag is to run together toward the flame jet, rather than to run away or disperse as is its action when skimming tools are used for clearing it off of the molten metal. Eddy currents are also apparently set up in the slag around the area directly affected by the flame-jet, which swirl toward the main stream of slag pushed toward the lip by the flame-jet. The slag which is swept over the lip of the ladle may fall into a pig-bed F or elsewhere. This action of the gas jet in attracting the slag surrounding the zone or area on which it is directly acting is of considerable practical importance in removing a thin layer of a fluid slag, and doing this quickly and completely.

The use of the present method of removing slags is especially advantageous in removing the fluid slags formed by alkaline reagents (as for example those containing caustic soda) used for treating metals. These alkaline reagents give off irritating fumes in the form of vaporized or minute particles of caustic soda. The carbon dioxid and monoxid, contained in the products of combustion from the burner D and perhaps other products, unite with the caustic soda fumes, forming sodium carbonate, and perhaps other products which are not irritating, and thereby act to neutralize said irritating fumes.

The supply of air (or oxygen) and fuel to the burner D is preferably so regulated that the flame is non-oxidizing, so that the flame will not cause oxidization of the metal. The character of the flame or gas used may, however, be varied to suit any subordinate or subsidiary purpose which it is desired to effect, and any other gas than that produced by burning fuel may be used.

Removal of slag from a ladle may be effected in about one minute by the use of the present method, so that the metal does not have to stand long enough while the slag is being removed, to be objectionably chilled. Moreover, removal of fluid slags may be more quickly and thoroughly effected by the present method than by the use of tools now commonly used for skimming slags from metal.

The invention may be carried out by other implements and by other modes of proceedure than those herein specifically described.

What I claim is:

1. A method of removing slag or residue, comprising blowing off the slag with a substantially neutral or reducing gas jet.

2. A method of removing slag or residue, comprising blowing off the slag with a jet of flame.

3. A method of removing slag or residue, comprising blowing off the slag with a jet of non-oxidizing flame.

4. A method of removing slag or residue, comprising blowing off the slag with a jet of non-oxidizing flame of burning carbonaceous fuel.

5. A method of removing slag or residue formed by alkaline reagents and simultaneously neutralizing the fumes of said alkaline reagents, comprising blowing off the slag with a jet of flaming carbonaceous fuel, an alkaline carbonate being formed by the carbon-dioxid of the flames and the alkaline fume.

6. A method of neutralizing fumes arising from reagents used in treating metals, comprising directing a jet of fluid capable of reacting with the fumes over the metal bath.

7. A method of neutralizing fumes arising from reagents used in treating metals, comprising directing a jet of gas capable of reacting with the fumes over the metal bath.

8. A method of neutralizing fumes arising from alkaline reagents used in treating metals, comprising burning a carbonaceous fuel over the metal bath whereby an alkaline carbonate is formed.

9. A method of neutralizing fumes arising from alkaline reagents used in treating metals, comprising directing a jet of a carbonaceous fuel over the metal bath, whereby an alkaline carbonate is formed.

In witness whereof, I have hereunto signed my name.

FREDERICK CONLIN.